July 2, 1957 G. W. BORKLAND 2,797,439
MEANS FOR MAKING A LAMP SHADE
Original Filed Dec. 21, 1949 2 Sheets-Sheet 1
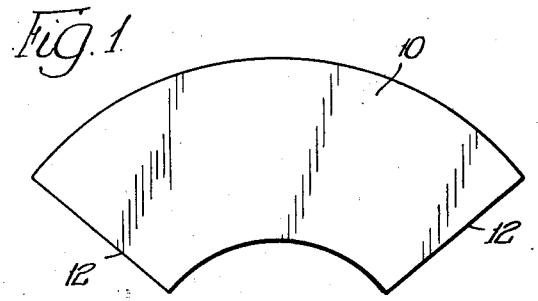
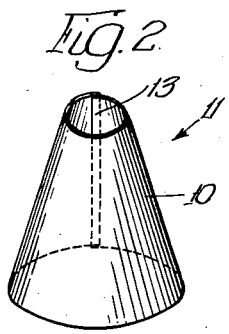
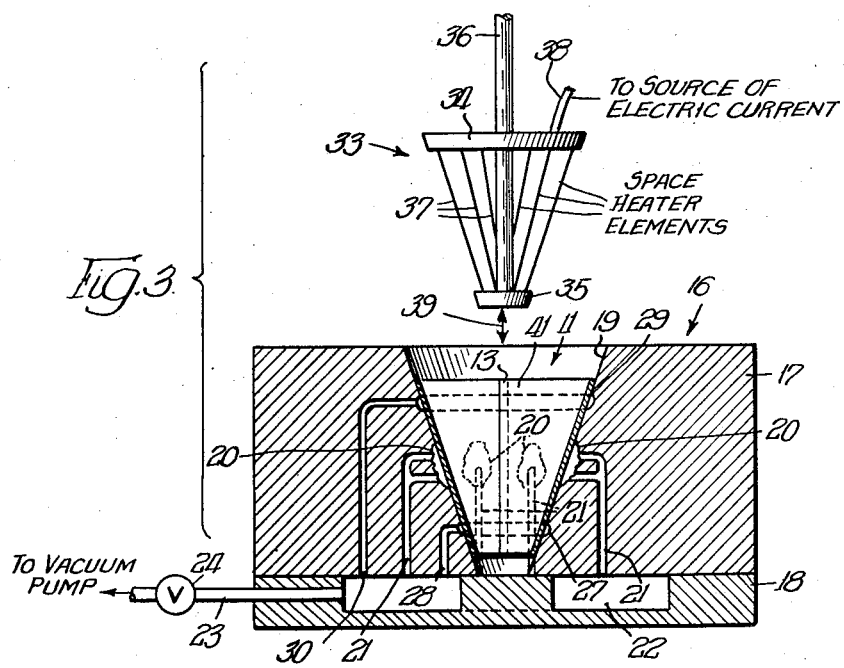
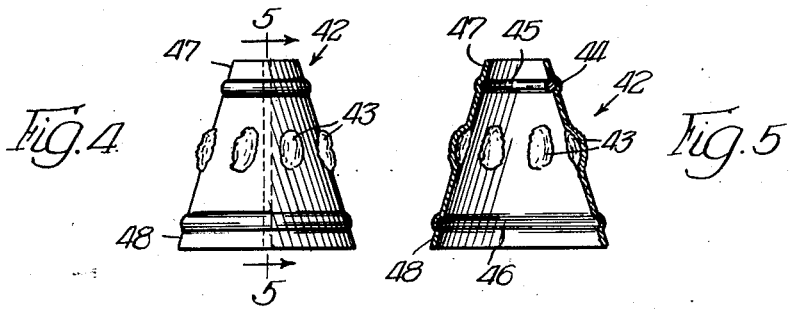
INVENTOR.
Gustave W. Borkland,
BY
Robert R. Lockwood
atty.

July 2, 1957 G. W. BORKLAND 2,797,439
MEANS FOR MAKING A LAMP SHADE
Original Filed Dec. 21, 1949 2 Sheets-Sheet 2
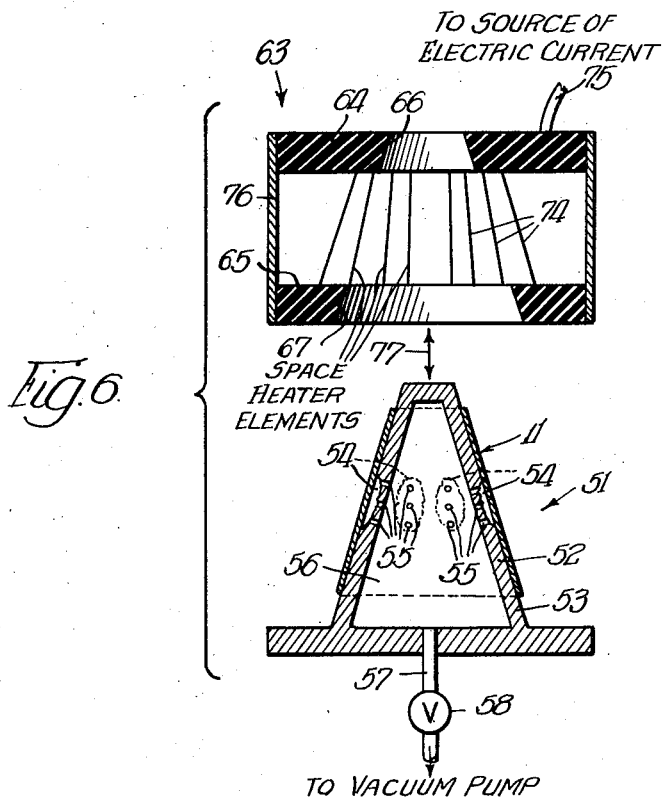
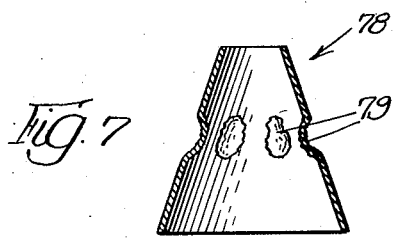
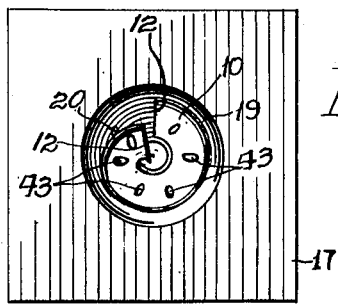
INVENTOR.
Gustave W. Borkland,
BY
Robert R. Lockwood
Atty.

United States Patent Office 2,797,439
Patented July 2, 1957

2,797,439
MEANS FOR MAKING A LAMP SHADE

Gustave W. Borkland, Marion, Ind.

Original application December 21, 1949, Serial No. 134,325. Divided and this application November 3, 1952, Serial No. 318,506

3 Claims. (Cl. 18—35)

This invention relates, generally, to means for making a new article of manufacture, and in particular it relates to apparatus for forming tubular articles, such as lamp shades. This application is a division of application Serial No. 134,325, filed December 21, 1949, now abandoned.

Among the objects of this invention are: To provide a tubular article, such as a lamp shade, of thermoplastic material having one or more embossments formed permanently therein; to provide such an article having a generally conical shape; to employ a flat sheet of material for this purpose; to curve the flat sheet generally to the shape desired for the ultimate article; to deform one or more areas of the sheet so shaped in order to provide the embossment of embossments; to heat the sheet to facilite its permanent deformation; to deform the sheet by applying fluid pressure to the area or areas to be deformed; to hold the ends of the article against lateral slipping while the deformation operation is being performed; and to remove the deformed and set article from the die employed in forming it by curling one or both of the free ends inwardly or outwardly to decrease or increase its diameter as the case may be.

Other objects of this invention will, in part, be obvious and in part appear hereinafter.

For a more complete understanding of the nature and scope of this invention, reference may be had to the following detailed description, taken together with the accompanying drawings, in which:

Figure 1 is a plan view of an arcuate sheet of thermoplastic material which is employed in practicing this invention;

Figure 2 is a perspective view of a frusto-conical configuration into which the sheet shown in Figure 1 can be curved;

Figure 3 is a cross-sectional view, somewhat diagrammatic in character, of a die and plug which can be used in practicing this invention;

Figure 4 is a view, in side elevation, of a lamp shade which may be formed in accordance with this invention;

Figure 5 is a detail sectional view taken generally along the line 5—5 of Figure 4;

Figure 6 is a vertical sectional view, somewhat diagrammatic in character, showing an alternate form of die and socket construction which may be employed in practicing this invention;

Figure 7 is a vertical sectional view of a lamp shade which may be formed on the die and socket construction shown in Figure 6;

Figure 8 is a top plan view of the die shown in Figure 3 and illustrating how the formed sheet can be removed.

Referring now particularly to Figures 1 and 2 of the drawings, it will be noted that the reference character 10 designates an arcuate sheet of thermoplastic material. It may be curved so as to form a frusto-conical configuration indicated, generally, at 11. This is accomplished by curving the sheet 10 until the ends 12 overlap each other as indicated at 13. If desired, the ends 12 can be arranged so as to form a butt joint and they can be secured together in any suitable manner such as by overlying a strip of the same material as may be desired.

As indicated the arcuate sheet 10 is formed of thermoplastic material. Also it may be formed of semithermoplastic material or reinforced thermoplastic material, for example, cellulose acetate, vinyl resins, ethyl cellulose, methyl methacrylate resin, etc.

In order to provide one or more permanent embossments in the arcuate sheet 10, it is curved into the frusto-conical configuration 11 and then is placed in a female die that is indicated, generally, at 16. The die 16 includes an upper die portion 17 and a lower die portion 18. The upper die portion 17 has a conical concave surface 19 the general outline of which conforms to the outer surface of the frusto-conical configuration 11. As shown the frusto-conical configuration 11 is inserted in the conical concave recess provided by the surface 19 so that it fits snugly therewith. The thickness of the material making up the frusto-conical configuration 11 is shown at a somewhat exaggerated scale. It will be understood that it may me of the order of a few thousandths of an inch thick as may be required. Of course it may be thicker where a heavier or thicker article is to be formed.

Specifically the embossments are provided in the frusto-conical configuration 11 by providing recesses or cavities 20 in the conical concave surface 19. The shape of these recesses or cavities 20 may be regular or irregular as may be desired. For example, they may be shaped so as to form a ribbon configuration, a flower, a hemisphere, etc. It will be understood that one or more recesses or cavities 20 may be provided depending upon the particular design which is to be formed on the frusto-conical configuration 11.

As will appear hereinafter, the frusto-conical configuration in situ is heated and fluid pressure is applied to the portions thereof overlying the recesses or cavities 20 so as to deform these portions thereinto. In order to permit the evacuation of the recesses or cavities 20 conduits 21 connect therewith and open into an annular chamber 22. As shown in Figure 3 the annular chamber may be connected by a conduit 23 through a valve 24 to a vacuum pump.

Near the lower end of the conical concave surface 19 there is provided a shallow annular groove 27 which may be connected by a conduit 28 to the annular chamber 22. The annular groove 27 is provided in order to form a correspondingly shaped groove in the upper end of the frusto-conical configuration 11 for the purpose of receiving a support member, such as a support ring, which may be employed in conventional manner for supporting the lamp shade in position on a lamp.

With a view to rigidifying the lower portion of the lamp shade, an annular groove 29 may be provided in the conical concave surface 19 and it may be connected by a conduit 30 to the annular chamber 22. This forms an annular groove or a radially outwardly extending rib in the lower portion of the lamp shade and acts to rigidify this portion and maintain it in the desired circular shape.

Cooperating with the die 16 is a holding and heating plug that is indicated, generally, at 33. The plug 33 includes upper and lower frusto-conical holding members 34 and 35 which are formed of heat resisting insulating material. They are mounted in spaced relation on a suitable operating rod 36 which can be moved either mechanically or manually as may be desired. The peripheries of the members 34 and 35 are shaped so as to engage the respective ends of the frusto-conical configuration 11 located, as shown, in the die 16 for holding them against lateral slipping while the heating and forming operations are being performed. Space heater elements 37 extend between the members 34 and 35 and are arranged to be energized by a flexible conductor assembly 38 which it will be understood is connected to a source of electric current as illustrated. It will be understood that the plug 33 is movable downwardly into the die 16 and upwardly away therefrom as indicated by the double headed arrow 39.

In operation, the arcuate sheet 10 is curved to form the conical configuration 11 and this is placed on the conical concave surface 19 of the die 16. The ends 12 may overlap, as indicated at 13, or they may be placed in abutting relation as may be desired. If desired, the valve 24 can be opened to apply vacuum to the recesses or cavities 20 and to the annular grooves 27 and 29. However, the material is not deformed because it is not yet heated to the plastic state.

Now the plug 33 is inserted in the cavity bounded by the conical concave surface 19 with the holding members 34 and 35 in engagement with the respective ends of the conical configuration 11 and the joint 13 is covered to prevent loss of pressure. This engagement takes place above the annular groove 29 and below the annular groove 27 and along the joint 13. The space heater elements 37 are energized sufficiently to heat the material in the areas overlying the recesses or cavities 20 and the annular grooves 27 and 29 sufficiently to permit these areas to be deformed into these recesses or cavities and grooves. The deformation takes place as a result of the atmospheric pressure applied to the sides of the material opposite the recesses or cavities 20 and the grooves 27 and 29.

As soon as the material has been suitably deformed, the space heaters 37 are deenergized, the deformed sheet 10 is allowed to cool, and then the plug 33 is withdrawn. The resulting article can be removed readily by picking up one end 41 and curling it inwardly as shown in Figure 8, so as to reduce the diameter of the lamp shade. Then it can be withdrawn readily upwardly.

Instead of using vacuum and atmospheric pressure to provide the desired differential pressure, fluid pressure, such as air pressure or steam, can be applied to the inside of the frusto-conical configuration 11 in the die 16, the holding members 34 and 35 engaging the ends and the joint 13 so as to provide a fluid-tight construction. Instead of using an electrical source of heat, the heat may be supplied by other means such as steam. In addition, instead of using space heater elements, infra-red bulbs or like units can be employed to provide spot heating.

The resultant product formed by the process and apparatus above described is illustrated as a lamp shade at 42 in Figure 4. Embossments 43 are formed in the outer surface and extend outwardly in conformity with the shapes of the recesses or cavities 20. An annular groove 44 is formed near the upper end for receiving a support ring 45. It will be understood that the ring 45 can be snapped in place if the ends 12 of the sheet have been secured together. Also it can be placed in position and thereafter the ends secured together. Near the lower end an annular groove 46 is formed which serves to rigidify this portion of the lamp shade 42. If desired the upper and lower end portions 47 and 48 may be trimmed off. Also these portions can be employed for applying a suitable fringe or border of cloth or other material as may be desired.

It will be seen that the foregoing method and apparatus provide a structure which is inherently self-supporting and requires no ribs or framework or supporting structure.

While the sheet 10 is in flat form it can be decorated, printed, or silk-screened depending upon the colors desired for the embossments 43.

In the formation of the lamp shade 42 as described hereinbefore the embossments 43 extend outwardly from the surface of the conical configuration 11. Where it is desired to have the embossments extend inwardly, the forming apparatus illustrated in Figure 6 may be employed.

As there shown a male die 51 is provided which includes a frusto-conically shaped support 52 the outer surface 53 of which is generally cone shaped and conforms to the shape of the inner surface of the frusto-conical configuration 11. As shown, this configuration is positioned on the surface 53 of the support 52. In the surface 53 there are provided one or more recesses or cavities 54 the shape of which is determined by the shape of the embossment that is desired. The recess or recesses 54 may be regularly or irregularly shaped as will be understood.

The area or areas of the frusto-conical configuration 11 overlying the recess or recesses 54 are arranged to be deformed inwardly by fluid pressure when heated in a manner to be described. In order to permit this action openings 55 are provided for placing the recesses or cavities 54 in communication with a chamber 56 that is formed in the die 51. For evacuating the chamber 56 a conduit 57 is provided in which a valve 58 may be positioned. On opening of the valve 58 the conduit 57 is placed in communication with a vacuum pump, as illustrated, and the chamber 56 is evacuated. If desired, the valve 58 can be omitted and the vacuum applied continuously to hold the configuration 11 in place.

Cooperating with the die 51 is a socket that is indicated, generally, at 63. It includes upper and lower holding members 64 and 65 that are formed of insulating material and each has a concave conical surface 66 and 67, respectively. The surfaces 66 and 67 are arranged to engage intimately the upper and lower ends of the conical configuration 11 on the die 51 for the purpose of holding them against lateral slipping.

In order to heat the sheet of thermoplastic material making up the conical configuration 11, space heater elements 74 are supported by the holding members 64 and 65 and are arranged in a generally conical shape so as to heat uniformly the surface of the plastic material. A flexible conductor 75 is arranged to connect the space heater elements 74 to a suitable source of electric current as illustrated. The holding members 64 and 65 are supported in spaced relation by a cylindrical support 76.

In operation the socket 63 is arranged to be moved downwardly and upwardly as indicated by the double headed arrow 77. After the sheet 10 of thermoplastic material is curved to form the conical configuration 11, it is placed on the die 51 as shown in Figure 6. Then the valve 58 may be opened and the chamber 56 can be evacuated. It may be that the conical configuration 11 will not provide a fluid-tight fit with the conical surface 53 at this time but no forming action can take place because the material has not been heated to a temperature sufficient to permit it to be deformed by fluid pressure. Now the socket 63 is moved downwardly until the conical surfaces 66 and 67 engage the upper and lower ends of the conical configuration 11, respectively. Sufficient pressure is exerted so that a fluid-tight seal now is provided between the inner surface of the conical configuration 11 and the outer conical surface 53. The space heater elements 74 are energized and sufficient heat is applied to the outer surface of the conical configuration 11 as will permit the areas thereof overlying the recesses or cavities 54 to be deformed. Because of the evacuation of the recesses or cavities 54, the areas of the thermoplastic material overlying them are drawn or stretched thereinto and conform to the shape thereof.

After the material has been deformed into the recesses or cavities 54, the valve 58 is closed, the space heater elements 74 are deenergized and the formed material is allowed to cool. Thereafter the socket 63 is moved upwardly. If the formed material does not lift readily from the die 51, one end of it may be grasped and it may be curled outwardly away therefrom as contrasted with the inward curling shown in Figure 8.

The resulting lamp shade construction is illustrated at 78 in Figure 7. Inwardly extending embossments 79 are formed permanently therein. Their shapes correspond to the shapes of the recesses or cavities 54 used for forming the same. As before, the sheet 10 employed for forming a lamp shade 78 can have imprinted thereon various colored designs which, when embossed, provide the desired decoration.

It will be understood that provision can be made for relative movement between the die 16 and the plug 33 in any suitable manner. Either may be stationary and the other movable or both may be movable. Likewise suitable means can be provided for effecting relative movement between the die 51 and the socket 63. Either may be stationary and the other movable or both may be movable toward and away from the other.

Since certain further changes can be made in the foregoing method and apparatus and different embodiments of the invention can be made without departing from the spirit and scope thereof, it is intended that all matter set forth in the foregoing description or shown in the accompanying drawings will be interpreted as illustrative and not in a limiting sense.

What is claimed as new is:

1. Apparatus for making conical articles, such as lamp shades, from thermoplastic sheet material comprising, in combination, a die having a continuous conical surface arranged and adapted to receive the sheet in preformed conical shape and having one or more cavities in said continuous surface; a cooperating relatively movable member for said die including spaced retaining means for engaging the ends of the cone shaped sheet and holding the same in engagement with said conical surface to prevent lateral slipping, and heating means between said retaining means for heating said sheet in situ to a temperature sufficient to permit it to be deformed; and means for applying a greater fluid pressure to the side of said sheet opposite said cavity or cavities than is applied to the other side to deform the area or areas overlying the same thereinto.

2. Apparatus for making conical articles, such as lamp shades, from thermoplastic sheet material comprising, in combination, a die having a continuous concave conical surface for receiving a conically shaped sheet and having one or more cavities in said continuous surface shaped to form one or more decorative embossments on said sheet, vacuum means connected to said cavity or cavities for evacuating the same; and plug means relatively movable with respect to said die including spaced circular retaining members for engaging the ends of the conical sheet and holding the same in engagement with said conical surface against lateral slipping, and heating means between said retaining members for heating at least the portion or portions of said sheet overlying said cavity or cavities to a temperature sufficient to permit the same to be deformed by the fluid pressure applied thereto on evacuation of said cavity or cavities.

3. Apparatus for making conical articles, such as lamp shades, from thermoplastic sheet material comprising, in combination, a die having a continuous convex conical surface for receiving a conically shaped sheet and having one or more cavities in said continuous surface shaped to form one or more decorative embossments on said sheet, vacuum means connected to said cavity or cavities for evacuating the same; and socket means relatively movable with respect to said die including spaced circular retaining members for engaging the ends of the conical sheet and holding the same in engagement with said conical surface against lateral slipping, and heating means between said retaining members for heating at least the portion or portions of said sheet overlying said cavity or cavities to a temperature sufficient to permit the same to be deformed by the fluid pressure applied thereto on evacuation of said cavity or cavities.

References Cited in the file of this patent

UNITED STATES PATENTS

| | | |
|---|---|---|
| Re. 23,171 | Borkland | Nov. 29, 1949 |
| 1,475,623 | Egerton | Nov. 27, 1923 |
| 1,588,933 | Bolger | June 15, 1926 |
| 1,885,951 | Salisbury | Nov. 1, 1932 |
| 1,989,015 | McKellip | Jan. 22, 1935 |
| 2,415,504 | MacDonald | Feb. 11, 1947 |
| 2,478,165 | Collins | Aug. 2, 1949 |
| 2,493,439 | Braund | Jan. 3, 1950 |